United States Patent
Lee et al.

(10) Patent No.: US 8,160,037 B2
(45) Date of Patent: Apr. 17, 2012

(54) SYSTEM AND METHOD FOR REINFORCING WIRELESS COMMUNICATION CAPABILITY WITHIN WIRELESS NETWORK GROUP

(75) Inventors: Ta-Yung Lee, Hsinchu (TW); Chih-Wen Cheng, Hsinchu (TW); Cheng-Hsien Yang, Hsinchu (TW); Chia-Chuan Wu, Hsinchu (TW)

(73) Assignee: Getac Technology Corporation, Hsinchu (TW)

( * ) Notice: Subject to any disclaimer, the term of this patent is extended or adjusted under 35 U.S.C. 154(b) by 769 days.

(21) Appl. No.: 12/176,094

(22) Filed: Jul. 18, 2008

(65) Prior Publication Data
US 2010/0014491 A1    Jan. 21, 2010

(51) Int. Cl.
*H04W 4/00*       (2009.01)
(52) U.S. Cl. ........................................... 370/338
(58) Field of Classification Search .................. 370/401, 370/216
See application file for complete search history.

(56) References Cited

U.S. PATENT DOCUMENTS

| | | | |
|---|---|---|---|
| 2003/0063613 A1* | 4/2003 | Carpini et al. | 370/401 |
| 2005/0090201 A1* | 4/2005 | Lengies et al. | 455/41.2 |
| 2005/0114551 A1* | 5/2005 | Basu et al. | 709/249 |
| 2005/0190717 A1* | 9/2005 | Shu et al. | 370/328 |
| 2008/0288165 A1* | 11/2008 | Suomela et al. | 701/201 |

* cited by examiner

*Primary Examiner* — Gary Mui
*Assistant Examiner* — Richard K Chang

(57) ABSTRACT

A method and system is provided to reinforce wireless communication capabilities between multiple network nodes of an wireless network group. The method and system first detects a wireless transmission capability between a first network node and a second network node. When the wireless transmission capability is lower than a threshold value, one set of reinforcing coordinates will be derived by introducing the first geographic information and the second geographic information. Afterwards, move a third network node to a position with the set of reinforcing coordinates to establish an alternative wireless transmission route between the first network note and second network node. Therefore, when an original wireless transmission route between any two network nodes is abnormal, the alternative wireless transmission route will be available in time and reduce the risks of losing transmission signals.

20 Claims, 6 Drawing Sheets

SYSTEM AND METHOD FOR REINFORCING WIRELESS COMMUNICATION CAPABILITY WITHIN WIRELESS NETWORK GROUP

BACKGROUND OF THE INVENTION

1. Field of the Invention

The present invention relates to wireless communication, in particular, to a method and system for reinforcing wireless network links within a wireless network group.

2. Related Art

Along with the rapid development of wireless transmission technology, the mass of the transmission wires and cables for connecting a computer with peripheral devices in the past are gradually replaced by wireless transceiver module built in the computer and the peripheral devices. These wireless transceiver modules transmit data between the computer and the peripheral devices according to specific wireless transmission protocols, without any substantial connections.

Likewise, two electronic devices or computers having built-in wireless transceiver modules transmit data there-between through wireless transmission, in which the common wireless transmission modes include WiFi, Bluetooth, infrared rays, and so on. Furthermore, through the above wireless transmission modes, Ad-hoc wireless local area network (WLAN) is established by two or more computers.

However, a disadvantage of the Ad-hoc WLAN lies in that a wireless transmission distance is not stable enough. For example, the standard IEEE 802.11 has a maximum transmission distance of about 400 meters in theory. However, if the two electronic devices are separated by a concrete wall or other barriers, the transmission distance is greatly reduced to 50 meters or even less than 50 meters.

For example, if there is merely one wireless transmission route between a first network node and a second network node, once the wireless transmission route is interrupted, the first network node cannot communicate with the second network node any more due to lack of another alternative wireless transmission route. Therefore, if there is merely one wireless transmission route between the first network node and the second network node, they suffer from an extremely high disconnection risk.

Therefore, the conventional Ad-hoc network has the problem of a high communication disconnection risk.

SUMMARY OF THE INVENTION

To solve the aforesaid problems of the prior art, the present invention provides a system and method for reinforcing the wireless communication capability between multiple network nodes of a wireless network group. When an original wireless transmission route between any two network nodes is abnormal, an alternative wireless transmission route will be available in time and reduce the risks of losing transmission signals.

In one aspect of the present invention, a method is provided to reinforce wireless communication capabilities between multiple network nodes of an wireless network group. The method first detects a wireless transmission capability between a first network node and a second network node. When the wireless transmission capability is lower than a threshold value, one set of reinforcing coordinates will be derived by introducing the first geographic information and the second geographic information. Afterwards, move a third network node to a position with the set of reinforcing coordinates to establish an alternative wireless transmission route between the first network note and second network node.

In another aspect of the present invention, a system is provided to reinforce wireless communication capabilities between multiple network nodes of an wireless network group. The system includes a detection module, a calculation module and a notification module. The detection module detects a wireless transmission capability between a first network node and a second network node. The calculation module derives at least one set of reinforcing coordinates by introducing first geographic information of the first network node and second geographic information of the second network node when the wireless transmission capability is lower than a threshold value. The notification module is to notify the third network node to move to a position with the set of reinforcing coordinates, to establish an alternative wireless transmission route between the first network node and second network node.

These and other features, aspects, and advantages of the present invention will become better understood with reference to the following description and appended claims. It is to be understood that both the foregoing general description and the following detailed description are examples, and are intended to provide further explanation of the invention as claimed.

BRIEF DESCRIPTION OF THE DRAWINGS

The present invention will become more fully understood from the detailed description given herein below for illustration only, and thus is not limitative of the present invention, and wherein.

DETAILED DESCRIPTION OF THE INVENTION

Figure 1A:
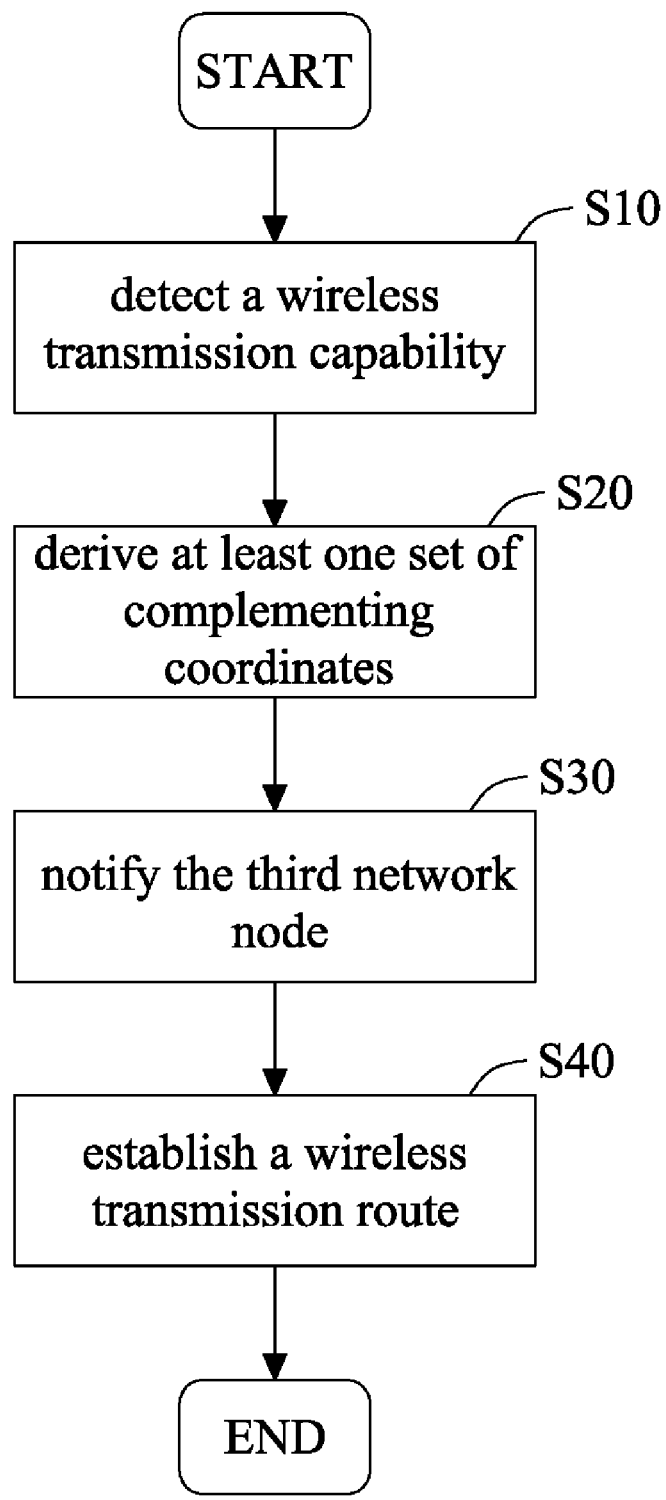
FIG. 1A is a flow chart of a method according to a first embodiment of the present invention.

Reference will now be made in detail to the present preferred embodiments of the invention, examples of which are illustrated in the accompanying drawings. Wherever possible, the same reference numbers are used in the drawings and the description refers to the same or the like parts.

All the following embodiments are applicable for a wireless network group with a wireless transmission mode. The wireless network group can be an Ad-hoc WLAN, which includes a plurality of network nodes. The data are transmitted between the network nodes by utilizing a wireless transmission mode, and each network node has geographic information corresponding to a position of each network node. The wireless transmission mode is WiFi, Bluetooth, or infrared rays. Furthermore, the geographic information in each embodiment is one of the following data formats, i.e., global positioning system (GPS) data, assisted global position system (AGPS) data, global positioning system cart (GPSC) data, differential global positioning system (DGPS) data, carrier-phase differential global positioning system (CDGPS)

data, Galileo positioning system data, and global navigation satellite system (GLONASS) data.

Figure 1B:
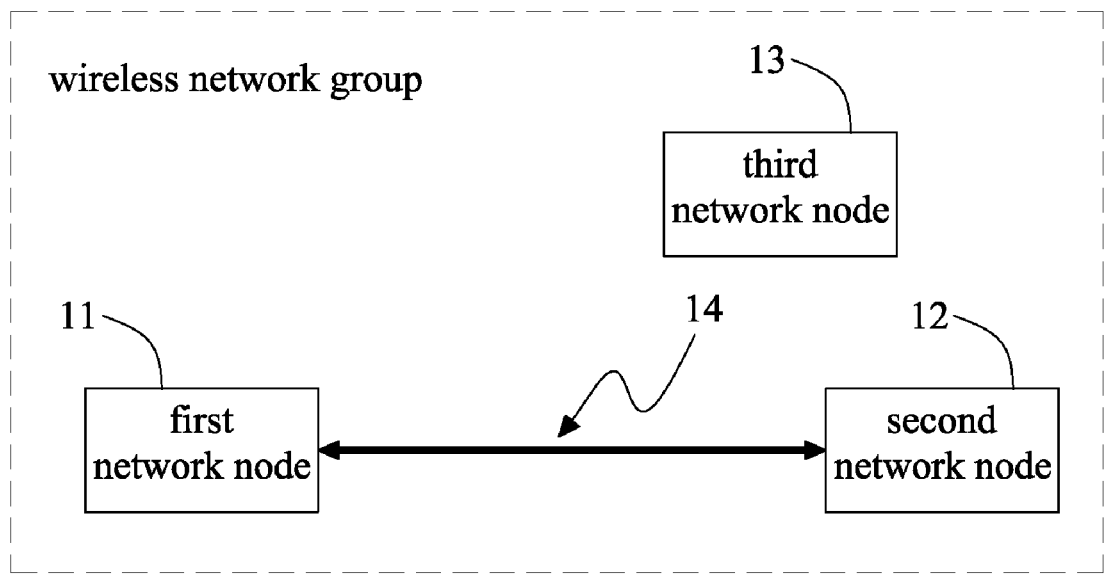
FIG. 1B and 1C are schematic views of the first embodiment of the present invention.
Figure 1C:
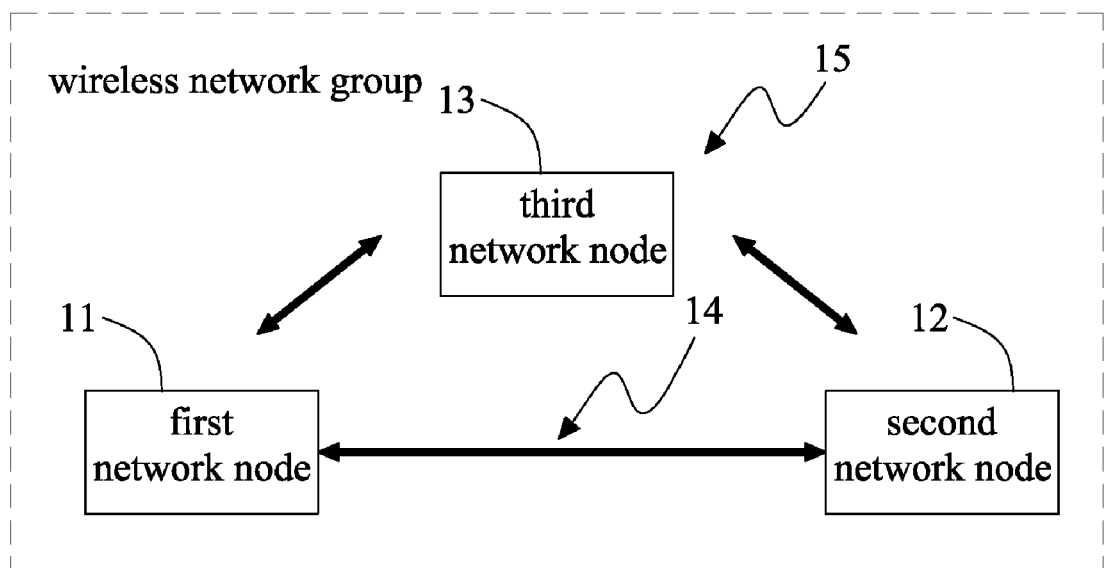

Referring to FIGS. 1A, 1B, and 1C, FIG. 1A is a flow chart of a method according to a first embodiment of the present invention and FIGS. 1B and 1C are schematic views of the first embodiment of the present invention. In the first embodiment, the wireless network group includes a plurality of network nodes. These network nodes include a first network node 11, a second network node 12, and a movable third network node 13. At least one initial wireless transmission route 14 exists between the first network node 11 and the second network node 12. This embodiment includes the following steps.

In Step S10, detect a wireless transmission capability. The wireless transmission capability between the first network node 11 and the second network node 12 is detected. The wireless transmission capability is defined as the number of wireless transmission routes, a wireless transmission rate, or a combination thereof, between the first network node and the second network node.

In Step S20, derive at least one set of reinforcing coordinates. At least one reinforcing coordinate is derived by introducing the first geographic information of the first network node 11 and the second geographic information of the second network node 12. The detailed steps are listed as follows.

(1) In Step S10, if the wireless transmission capability is defined as the number of wireless transmission routes, the threshold value is defined as a minimum value of the number of initial wireless transmission routes 14 between the first network node 11 and the second network node 12. When the number of initial wireless transmission routes 14 is less than the threshold value, at least one set of reinforcing coordinate is derived based on the first geographic information of he first network node 11 and the second geographic information of the second network node 12.

(2) In Step S10, if the wireless transmission capability is defined as the wireless transmission rate, the threshold value is defined as a minimum transmission rate between the first network node 11 and the second network node 12. When the wireless transmission rate between the first network node 11 and the second network node 12 is less than the threshold value, at least one set of reinforcing coordinate is derived based on the first geographic information of the first network node 11 and the second geographic information of the second network node 12.

(3) In Step S10, if the wireless transmission capability is defined as a combination of the above (1) and (2), when the wireless transmission capability is less than both the threshold values described in the above (1) and (2), at least one set of reinforcing coordinate is derived based on the first geographic information of the first network node 11 and the second geographic information of the second network node 12.

(4) In Step S10, if the wireless transmission capability is defined as a combination of the above (1) and (2), when the wireless transmission capability is less than any one of the threshold values described in the above (1) and (2), at least one set of reinforcing coordinate is derived based on the first geographic information of the first network node 11 and the second geographic information of the second network node 12.

In Step S30, notify the third network node. The network node 13 is notified to move to a position with the set of reinforcing coordinates.

Furthermore, before notifying the third network node 13, this embodiment further includes a step of searching for a network node having the smallest straight-line distance to a position with the set of reinforcing coordinates in the wireless network group to serve as the third network node 13. Alternatively, before notifying the third network node 13, a network node having the smallest path length to a position with the set of reinforcing coordinates is searched in the wireless network group to serve as the third network node 13. When the network group is located in a spacious geographical environment without any barriers, it is suggested to search for a network node having the smallest straight-line distance to a position with the set of reinforcing coordinates in the wireless network group as the third network node 13. When the network group is located in an environment having dense buildings or barriers, it is suggested to search for a network node having the smallest path length to a position with the set of reinforcing coordinates as the third network node 13 according to allowable paths among the buildings or barriers.

In Step S40, establish a wireless transmission route. The third network node 13 arrives at the position with the reinforcing coordinates to establish an alternative first wireless transmission route 15 is established between the first network node 11 and the second network node 12, so that the data of the first network node 11 are transmitted to the second network node 12 via the third network node 13, and meanwhile, the data of the second network node 12 are transmitted to the first network node 11 via the third network node 13.

It is noted that, the alternative first wireless transmission route 15 between the first network node 11 and the second network node 12 does not necessarily replace the initial wireless transmission route 14, and the first wireless transmission route 15 is merely provided for enabling the first network node 11 and the second network node 12 to select to perform wireless transmission via the initial wireless transmission route 14 or the first wireless transmission route 15.

Therefore, in this embodiment, the first wireless transmission route 15 is added to reinforce wireless links between the first network node 11 and the second network node 12, thereby reducing the disconnection possibility between the first network node 11 and the second network node 12.

Figure 2:
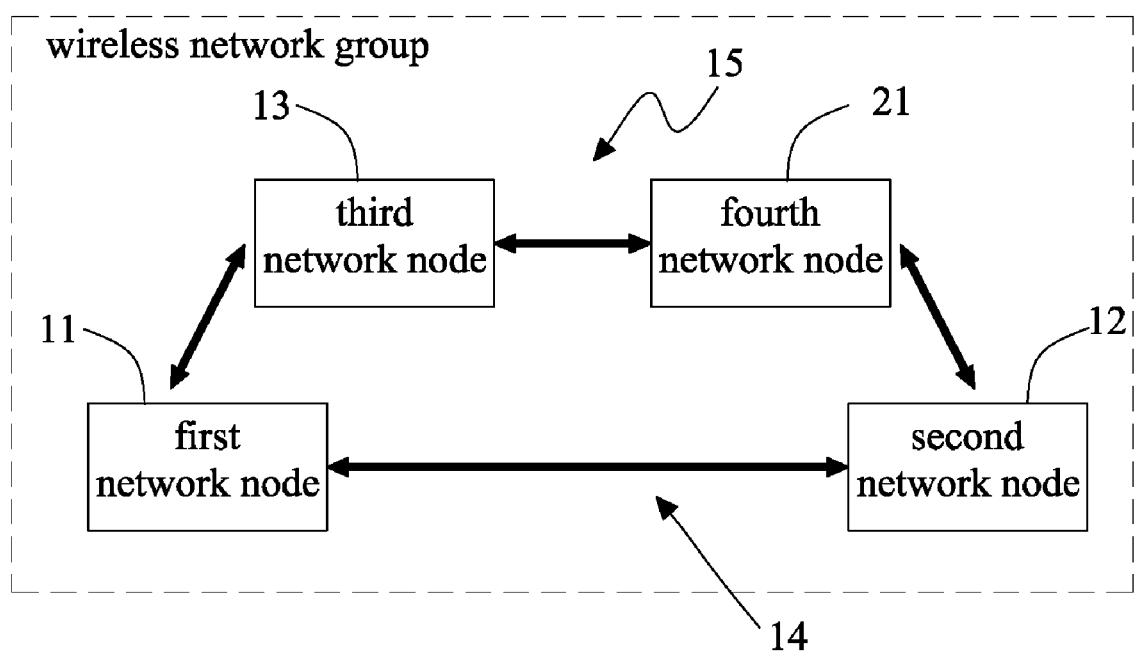
FIG. 2 is a schematic view of a second embodiment of the present invention.

FIG. 2 is a schematic view of a second embodiment of the present invention. This embodiment aims at solving the problem that a new wireless transmission route cannot be established between the first network node 11 and the second network node 12 merely depending on the third network node 13. This embodiment is different from the first embodiment in that, the reinforcing coordinates include a first set of reinforcing coordinates and a second set of reinforcing coordinates. The third network node 13 is notified to move to a position with the first set of reinforcing coordinates. And the wireless network group further includes a movable fourth network node 21, and the fourth network node 21 is notified to move to another position with the second set of reinforcing coordinates. When the fourth network node 21 arrives at the position with the second set of reinforcing coordinates, the third network node 13 and the fourth network node 21 are connected is series to establish the alternative first wireless transmission route 15 between the first network node 11 and the second network node 12.

Figure 3A:
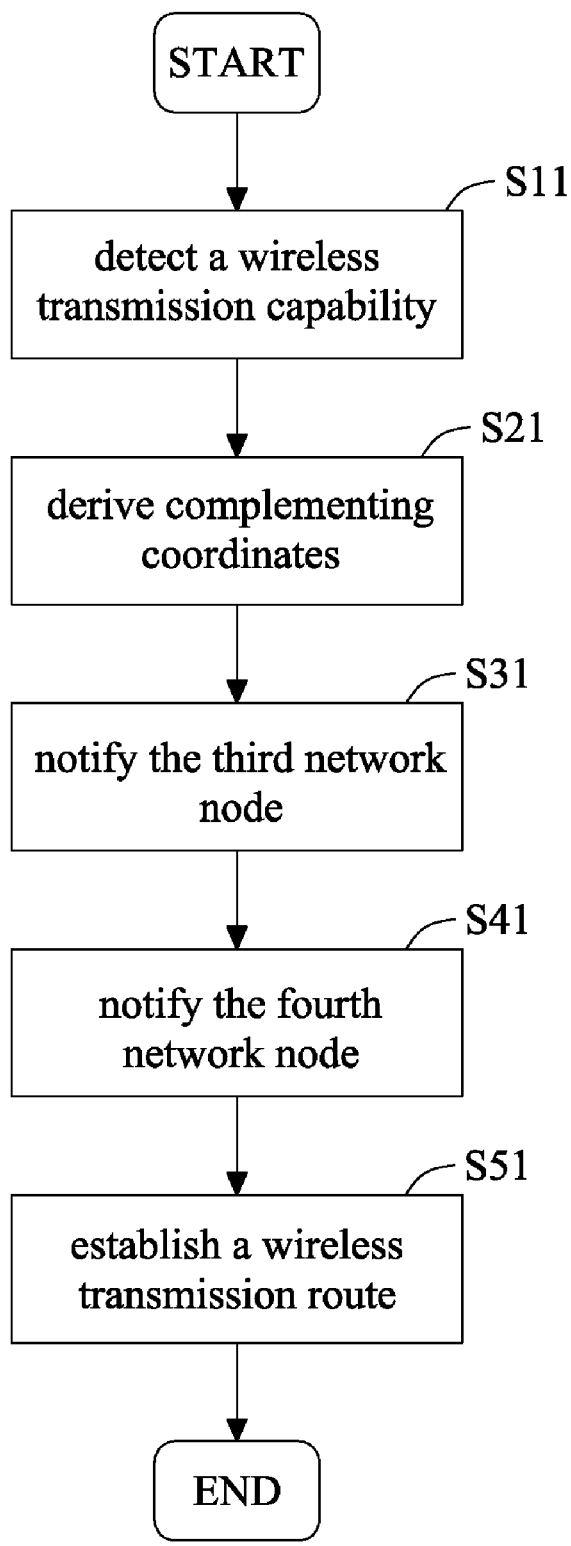
FIG. 3A is a flow chart of a method according to a third embodiment of the present invention.
Figure 3B:
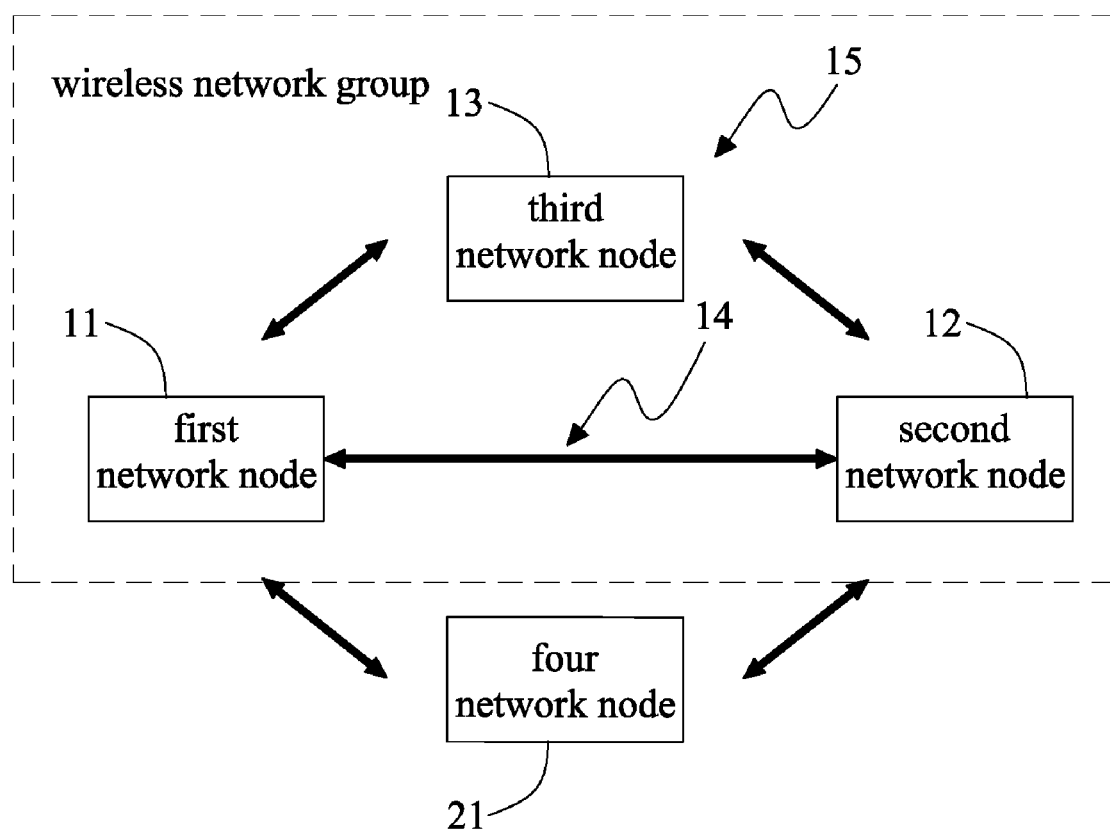
FIG. 3B is a schematic view of the third embodiment of the present invention.

FIGS. 3A and 3B are respectively a flow chart and a schematic view of a method according to a third embodiment of the present invention, which include the following steps.

Step S11 is the same as Step S10.

In Step S21, derive reinforcing coordinates. This step includes all the contents of Step S20 in the first embodiment, and further derives a first set of reinforcing coordinates and a second set of reinforcing coordinates by introducing the first geographic information of the first network node 11 and the second geographic information of the second network node 12.

In Step S31, notify the third network node. The third network node 13 is notified to move to one of the first set of reinforcing coordinates and the second set of reinforcing coordinates.

In Step S41, notify the fourth network node. The fourth network node 21 is notified to move to another one of the first set of reinforcing coordinates and the second set of reinforcing coordinates.

In Step S51, establish a wireless transmission route.

Through the third network node 13 and the fourth network node 21, an alternative first wireless transmission route 15 and another alternative second wireless transmission route 32 are respectively established between the first network node 11 and the second network node 12, so that the first network node 11 and the second network node 12 may select to perform wireless transmission through the initial wireless transmission route 14, the first wireless transmission route 15, or the second wireless transmission route 32, as shown in FIG. 3B.

Besides the first wireless transmission route 15, this embodiment further adds the second wireless transmission route 32. Compared with the above embodiments, this embodiment further reinforce the wireless link between the first network node 11 and the second network node 12, and further reduces the disconnection possibility between the first network node 11 and the second network node 12.

Although only the third network node 13 and the fourth network node 21 in the second and third embodiments are connected in series or in parallel to establish the wireless transmission route, in practice, it can be easily appreciated that, a plurality of network nodes may be connected in series and in parallel to establish a new wireless transmission route. For example, they are connected in series first and then connected in parallel, or they are connected in parallel first and then connected in series, so as to establish a new wireless transmission route.

Figure 4:
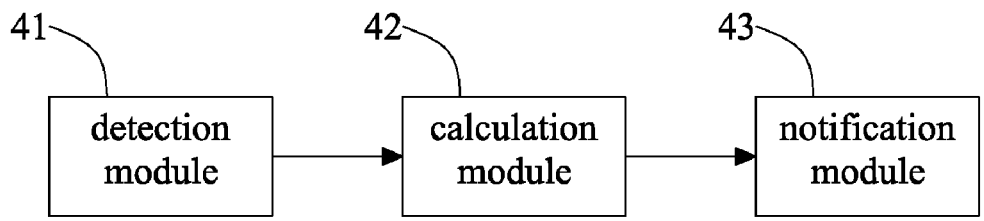
FIG. 4 is a first schematic view of a system according to a fourth embodiment of the present invention.
Figure 5:
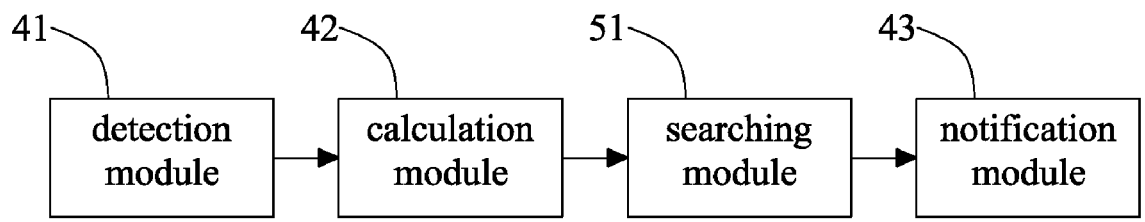
FIG. 5 is a second schematic view of the system according to the fourth embodiment of the present invention.

FIG. 4 is a first schematic view of a system according to a fourth embodiment of the present invention, which includes a detection module 41, a calculation module 42, and a notification module 43. This embodiment is illustrated based on the architectures in the first to third embodiments.

The detection module 41 is adapted for detecting the wireless transmission capability between the first network node 11 and the second network node 12, in which the wireless transmission capability is defined in Step S20 in the first embodiment.

The calculation module 42 is for deriving at least one set of reinforcing coordinate by introducing the first geographic information of the first network node 11 and the second geographic information of the second network node 12 when the wireless transmission capability is lower than the threshold value. The calculation manner of the reinforcing coordinates can be obtained with reference to the first, second, and third embodiments.

The notification module 43, as described in Step S40 in the first embodiment, is adapted for notifying the third network node 13 to move to a position with the reinforcing coordinates. Thus, the third network node 13 arrives at the reinforcing coordinates to establish the alternative first wireless transmission route 15 between the first network node 11 and the second network node 12.

The notification module 43, as described in the second embodiment, is adapted for notifying the third network node 13 to move to a position with the first set of reinforcing coordinates and the fourth network node 21 to move to another position with the second reinforcing coordinates respectively. Thus, when the third network node 13 arrives at the position with the first set of reinforcing coordinates and the fourth network node 21 arrives at the position with the second set of reinforcing coordinates, the third network node 13 and the fourth network node 21 are connected in series, to establish the alternative first wireless transmission route 15.

The notification module 43, as described in Step S41 in the third embodiment, is further adapted for notifying the third network node 13 to move to a position with the first set of reinforcing coordinates and the fourth network node 21 to move to another position with the second set reinforcing coordinates respectively. Thus, when the third network node 13 arrives at the position with the first set of reinforcing coordinates and the fourth network node 21 arrives at the other position with the second reinforcing coordinates respectively, the alternative first wireless transmission route 15 and another alternative second wireless transmission route 32 are respectively established in parallel between the first network node 11 and the second network node 12.

The present invention further includes for a network node having the smallest straight-line distance to a position with the first set of reinforcing coordinates in the wireless network group to serve as the third network node 13. And, the search module 51 is also adapted for searching for a network node having the smallest straight-line distance to a position with the second reinforcing coordinates to serve as the fourth network node 21. Alternatively, the search module 51 is adapted for searching for a network node having the smallest path length to a position with the set of the first reinforcing coordinates in the wireless network group to serve as the third network node 13, and searching for a network node having the smallest path length to another position with the second set of reinforcing coordinates to serve as the fourth network node 21.

When the wireless network group is located in a spacious geographical environment without any barriers, it is suggested to search for a network node having the smallest straight-line distance to the position with the first set of reinforcing coordinates in the wireless network group to serve as the third network node 13 and to search for a network node having the smallest straight-line distance to a position with the second set of reinforcing coordinates in the wireless network group to serve as the fourth network node 21. When the wireless network group is located in an environment having dense buildings or barriers, it is suggested to search for a network node having the smallest path length to a position with the first set of reinforcing coordinates in the wireless network group to serve as the third network node 13, and to search for a network node having the smallest path length to another position with the second set reinforcing coordinates in the wireless network group to serve as the fourth network node 21 according to the allowable paths among the buildings or barriers.

Additional advantages and modifications will readily occur to those proficient in the relevant fields. The invention in its broader aspects is therefore not limited to the specific details and representative embodiments shown and described herein. Accordingly, various modifications may be made without departing from the spirit or scope of the general inventive concept as defined by the appended claims and their equivalents.

What is claimed is:

1. A method for reinforcing wireless network links within a wireless network group, the wireless network group comprising a first network node, a second network node and a movable third network node, and first geographic information, second geographic information and third geographic information respectively corresponding to positions of the first network node, the second network node and the third network node, wherein the first network node, the second network node and the third network node are not collinear, the method comprising the steps of:

detecting a wireless transmission capability between the first network node and the second network node, wherein the wireless transmission capability is defined as the combination of a number of wireless transmission routes and a wireless transmission rate;

deriving at least one set of reinforcing coordinates, when the wireless transmission capability is lower than a threshold value of both a minimum number of wireless transmission routes and a minimum wireless transmission rate, according to the first geographic information and the second geographic information; and moving the third network node to a position with the set of reinforcing coordinates to establish an alternative wireless transmission route between the first network note and second network node.

2. A system for reinforcing wireless network links within a wireless network group, the wireless network group comprising a first network node, a second network node and a movable third network node, and first geographic information, second geographic information and third geographic information respectively corresponding to positions of the first network node, the second network node and the third network node, wherein the first network node, the second network node and the third network node are not collinear, the system comprising:

a detection module, for detecting a wireless transmission capability between the first network node and the second network node, wherein the wireless transmission capability is defined as the combination of a number of wireless transmission routes and a wireless transmission rate;

a calculation module, for deriving at least one set reinforcing coordinates according to the first geographic information and the second geographic information when the wireless transmission capability is lower than a threshold value of both a minimum number of wireless transmission routes and a minimum wireless transmission rate; and a notification module, for notifying the third network node to move to a position with the set of reinforcing coordinates, to establish an alternative wireless transmission route between the first network node and second network node.

3. The method for reinforcing wireless network links as claimed in claim 1, wherein the third network node arrives at a position with the set of reinforcing coordinates to establish the alternative wireless transmission route between the first network node and the second network node, and the alternative wireless transmission route is provided for wireless transmission between the first network node and the second network node.

4. The method for reinforcing wireless network links as claimed in claim 1, wherein the wireless network group comprises a plurality of network nodes, and each network node respectively has geographic information corresponding to a position of each network node, and after the step of deriving the set of reinforcing coordinates, the method further comprises a step of:

searching for a network node having a smallest straight-line distance to a position with the set of reinforcing coordinates in the wireless network group to serve as the third network node by introducing the geographic information of each network node in the wireless network group.

5. The method for reinforcing wireless network links as claimed in claim 1, wherein the wireless network group comprises a plurality of network nodes, and each network node respectively has geographic information corresponding to a position of each network node, and after the step of deriving the set of reinforcing coordinates, the method further comprises a step of:

searching for a network node having a smallest path length to a position with the set of reinforcing coordinates in the wireless network group to serve as the third network node by introducing the geographic information of each network node in the wireless network group.

6. The method for reinforcing wireless network links as claimed in claim 1, wherein the data format of the first geographic information, the second geographic information, and the third geographic information is selected from the groups consisting of global positioning system data, assisted global position system data, global positioning system cart data, differential global positioning system data, carrier-phase differential global positioning system data, Galileo positioning system, and global navigation satellite system data.

7. The method for reinforcing wireless network links as claimed in claim 1, wherein the reinforcing coordinates comprise a first set of reinforcing coordinates and a set of second reinforcing coordinates, and the wireless network group comprises a movable fourth network node, the third network node is notified to move to a position with the first set of reinforcing coordinates, and the fourth network node is notified to move to another position with the second set of reinforcing coordinates.

8. The method for reinforcing wireless network links as claimed in claim 1, wherein the reinforcing coordinates comprise a first set of reinforcing coordinates and a second set of reinforcing coordinates, and the third network node and a movable fourth network node in the wireless network group are notified to move to a position with the first set of reinforcing coordinates and another position with the second set of reinforcing coordinates respectively, so that the third and forth network nodes are connected in series to establish the alternative wireless transmission route.

9. The method for reinforcing wireless network links as claimed in claim 1, wherein the wireless transmission capability is a number of wireless transmission routes or a wireless transmission rate between the first network node and the second network node.

10. The system for reinforcing wireless network links as claimed in claim 2, wherein the wireless network group comprises a plurality of network nodes, and each network node respectively has geographic information corresponding to a position of each network node, the system further comprises:

a search module, for searching for a network node having a smallest straight-line distance to a position with the set of reinforcing coordinates in the wireless network group to serve as the third network node by introducing the geographic information of each network node in the wireless network group.

11. The system for reinforcing wireless network links as claimed in claim 2, wherein the wireless network group comprises a plurality of network nodes, and each network node respectively has geographic information corresponding to a position of each network node, the system further comprises:

a search module, for searching for a network node having a smallest path length to a position with the set of reinforcing coordinates in the wireless network group to serve as the third network node by introducing the geographic information of each network node in the wireless network group.

12. The system for reinforcing wireless network links as claimed in claim 2, wherein the reinforcing coordinates comprise a first set of reinforcing coordinates and a second set of reinforcing coordinates, and the wireless network group comprises a movable fourth network node, the third network node is notified to move to a position with the first reinforcing coordinates, and the fourth network node is notified to move to another position with the second reinforcing coordinates.

13. The system for reinforcing wireless network links as claimed in claim 2, wherein the wireless transmission capability is a number of wireless transmission routes or a wireless transmission rate between the first network node and the second network node.

14. The method for reinforcing wireless network links as claimed in claim 7, further comprising a step of:
   establishing another alternative wireless transmission route between the first network node and second network node when the fourth network node arriving at a position with the second set of reinforcing coordinates.

15. The method for reinforcing wireless network links as claimed in claim 7, wherein the wireless network group comprises a plurality of network nodes, and each network node respectively has geographic information corresponding to a position of each network node, and after the step of deriving the set of reinforcing coordinates, the method further comprises a steps of:
   searching for a network node having a smallest straight-line distance to a position with the second set of reinforcing coordinates in the wireless network group to serve as the fourth network node by introducing the geographic information of each network node in the wireless network group.

16. The method for reinforcing wireless network links as claimed in claim 7, wherein the wireless network group comprises a plurality of network nodes, and each network node respectively has geographic information corresponding to a position of each network node, and after the step of deriving the set of reinforcing coordinates, the method further comprises a steps of:
   searching for a network node having a smallest path length to a position with the second set of reinforcing coordinates in the wireless network group to serve as the fourth network node by introducing the geographic information of each network node in the wireless network group.

17. The system for reinforcing wireless network links as claimed in claim 12, wherein the third network node arrives at a position with the first set of reinforcing coordinates to establish the alternative wireless transmission route between the first network node and the second network node, and the fourth network node arrives at another position with the second set of reinforcing coordinates to establish another alternative wireless transmission route between the first network node and the second network node.

18. The system for reinforcing wireless network links as claimed in claim 12, wherein the wireless network group comprises a plurality of network nodes, and each network node respectively has geographic information corresponding to a position of each network node, the system further comprises:
   a search module, for searching for a network node having a smallest straight-line distance to a position with the second set of reinforcing coordinates in the wireless network group to serve as the fourth network node by introducing the geographic information of each network node in the wireless network group.

19. The system for reinforcing wireless network links as claimed in claim 12, wherein the wireless network group comprises a plurality of network nodes, and each network node respectively has geographic information corresponding to a position of each network node, the system further comprises:
   a search module, for searching for a network node having a smallest path length to a position with the set of reinforcing coordinates in the wireless network group to serve as the fourth network node by introducing the geographic information of each network node in the wireless network group.

20. The system for reinforcing wireless network links as claimed in claim 12, wherein the reinforcing coordinates comprise a first set of reinforcing coordinates and a second set of reinforcing coordinates, and the third network node and a movable fourth network node in the wireless network group are notified to move to the first set of reinforcing coordinates and the second set of reinforcing coordinates respectively, so that the third and forth network nodes are connected in series to establish the alternative wireless transmission route.

\* \* \* \* \*